US012592004B2

(12) United States Patent
Murakami et al.

(10) Patent No.: US 12,592,004 B2
(45) Date of Patent: Mar. 31, 2026

(54) IMAGE PROCESSING DEVICE AND IMAGE PROCESSING METHOD

(71) Applicant: Faurecia Clarion Electronics Co., Ltd., Saitama (JP)

(72) Inventors: Tetsuro Murakami, Saitama (JP); Naoto Sakata, Saitama (JP); Masashi Koga, Saitama (JP)

(73) Assignee: FAURECIA CLARION ELECTRONICS CO., LTD., Saitama (JP)

( * ) Notice: Subject to any disclaimer, the term of this patent is extended or adjusted under 35 U.S.C. 154(b) by 158 days.

(21) Appl. No.: 18/389,932

(22) Filed: Dec. 20, 2023

(65) Prior Publication Data

US 2024/0212226 A1     Jun. 27, 2024

(30) Foreign Application Priority Data

Dec. 27, 2022     (JP) ................................ 2022-210906

(51) Int. Cl.
*G06T 11/00*        (2006.01)
*G06F 3/01*         (2006.01)
*G06F 3/14*         (2006.01)
*G06T 5/80*         (2024.01)

(52) U.S. Cl.
CPC .............. *G06T 11/00* (2013.01); *G06F 3/013* (2013.01); *G06F 3/14* (2013.01); *G06T 5/80* (2024.01)

(58) Field of Classification Search
CPC ...................................................... G06T 11/00
See application file for complete search history.

(56)                References Cited

U.S. PATENT DOCUMENTS

| | | | | |
|---|---|---|---|---|
| 8,035,575 B2 | 10/2011 | Okabe et al. | | |
| 8,179,435 B2 | 5/2012 | Akatsuka et al. | | |
| 2008/0239527 A1* | 10/2008 | Okabe | ...................... | B60R 1/25 |
| | | | | 359/843 |
| 2019/0005608 A1* | 1/2019 | Bayerl | .................... | G06T 3/608 |

FOREIGN PATENT DOCUMENTS

| | | |
|---|---|---|
| JP | 2007096638 A | 4/2007 |
| JP | 2009005054 A | 1/2009 |
| JP | 4412365 B2 | 2/2010 |
| JP | 4683272 B2 | 5/2011 |

* cited by examiner

*Primary Examiner* — Shivang I Patel
(74) *Attorney, Agent, or Firm* — Reising Ethington P.C.

(57)                ABSTRACT

An image processing device connected to a display device having a non-planar screen. The image processing device generates a parameter for generating a display-target image in accordance with information on an eye position; generates a display-target image from an outside-world image based on the generated parameter; and outputs the generated display-target image to the display device. The parameter includes: an element of a projective transformation matrix for transforming the coordinates of the outside-world image from those in the first coordinate system corresponding to the real space into those in the coordinate system (a second coordinate system) of the outside-world image; and an element of a projective transformation matrix for transforming, into the coordinates of the screen, the coordinates of a part of the outside-world image corresponding to the area of the reference plane to be displayed on the screen.

14 Claims, 11 Drawing Sheets

Figure 6:
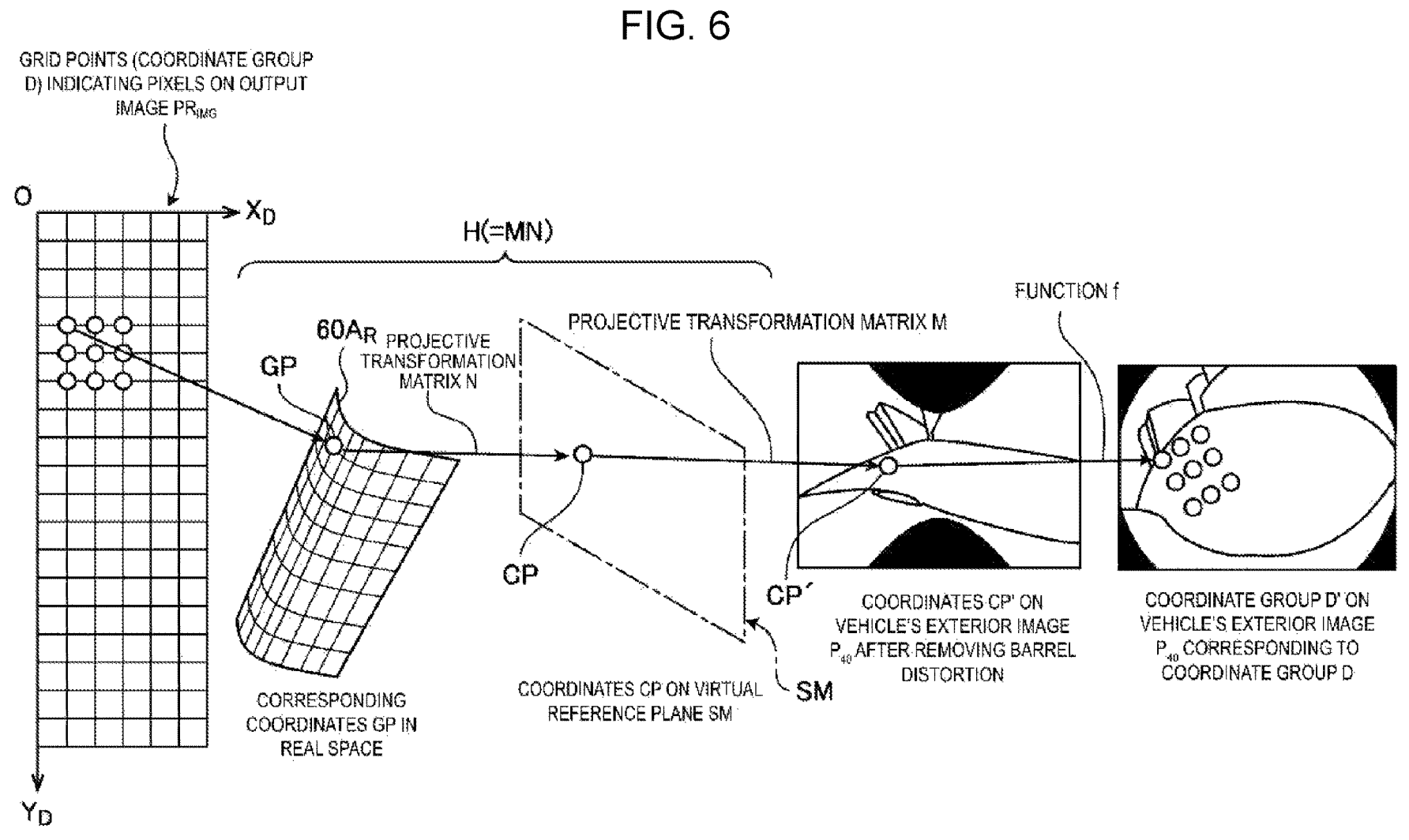

GRID POINTS (COORDINATE GROUP D) INDICATING PIXELS ON OUTPUT IMAGE $PR_{IMG}$ $X_D$ $Y_D$

O $H(=MN)$

60AR

GP

PROJECTIVE TRANSFORMATION MATRIX N

CORRESPONDING COORDINATES GP IN REAL SPACE

PROJECTIVE TRANSFORMATION MATRIX M

CP

COORDINATES CP ON VIRTUAL REFERENCE PLANE SM

SM

CP′

COORDINATES CP′ ON VEHICLE'S EXTERIOR IMAGE $P_{40}$ AFTER REMOVING BARREL DISTORTION

FUNCTION f

COORDINATE GROUP D′ ON VEHICLE'S EXTERIOR IMAGE $P_{40}$ CORRESPONDING TO COORDINATE GROUP D

FIG. 9
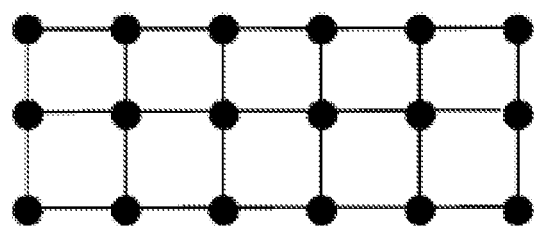
GRID POINT GROUP (COORDINATE GROUP D)
OF THE OUTPUT IMAGE PR$_{IMG}$
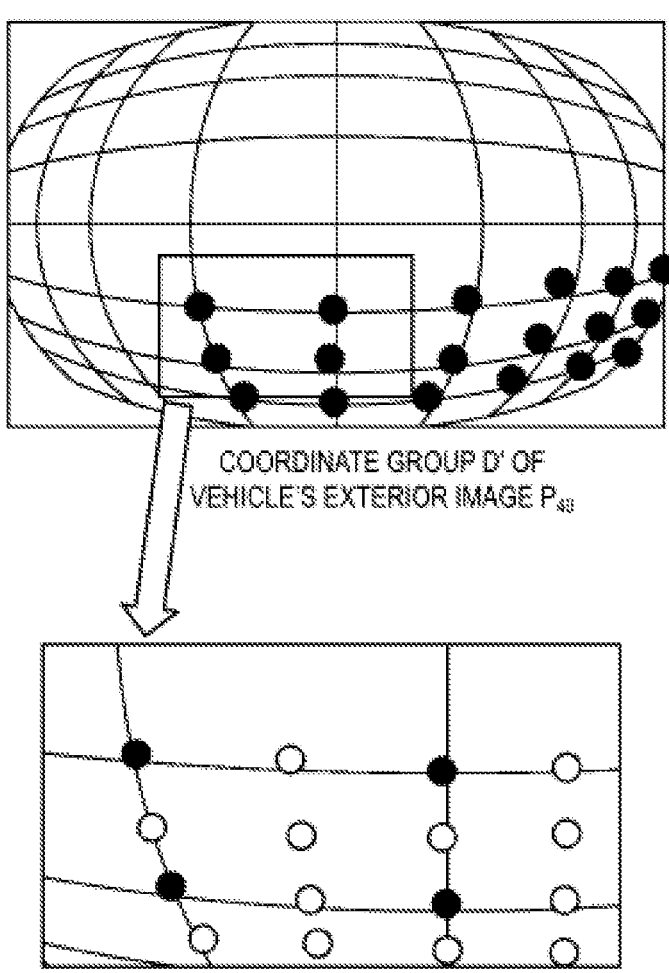
COORDINATE GROUP D' OF
VEHICLE'S EXTERIOR IMAGE P$_{all}$
OUTPUT IMAGE PR$_{IMG}$ AFTER INTERPOLATION

FIG. 11

IMAGE PROCESSING DEVICE AND IMAGE PROCESSING METHOD

TECHNICAL FIELD

The present invention relates to an image processing device and image processing method.

BACKGROUND

An image processing device capable of displaying an image that expands the field of vision of a driver is known. A specific configuration of this type of image processing device is described in, for example, Patent Document 1 (JP 2007-096638 A).

The image processing device described in Patent Document 1 converts the coordinates of a captured image of the outside of a vehicle by an image capture device to display, on a screen of a display device, an image equivalent to the one that the driver views the outside of the vehicle from his/her eye-point through the installation region of a display device as if the installation region were empty.

Some display devices installed in a pillar portion in a vehicle cabin have a display device using a flexible-shape display with a curved-surface screen. A screen having such a complicated shape needs an enormous amount of computation to render a vehicle's exterior image that is deemed natural when the occupant of the vehicle views it. What is thus required is an image processing device having high processing capacity, which requires an increased cost.

Therefore, in light of the foregoing, an object of the present application is to provide an image processing device and an image processing method that can reduce the load of processing a moving body's outside-world image to be displayed on a non-planar screen.

SUMMARY

An image processing device according to an embodiment of the present application is a device disposed in a moving body and connected to a display device having a screen at least a part of which is non-planar. The image processing device includes an eye-point information acquisition unit that acquires information on an eye position of an occupant of a moving body, an image acquisition unit that acquires an outside-world image showing an outside world of the moving body, a parameter generation unit that generates a parameter for generating a display-target image to be displayed on a display device from the outside-world image according to the information on the eye position, an image generation unit that generates the display-target image from the outside-world image based on the parameter generated by the parameter generation unit, and an image output unit that outputs the display-target image generated by the image generation unit to the display device. The parameter includes at least the following two elements. A first element is an element of a projective transformation matrix for transforming the coordinates on a reference plane set in a real space from a first coordinate system corresponding to the real space into a second coordinate system which is the coordinate system of the outside-world image. A second element is an element of a projective transformation matrix for transforming the coordinates of the screen into the coordinates of the outside-world image of a part of the reference plane corresponding to the area to be displayed on the screen. The latter conversion is performed by specifying the coordinate on the reference plane, which is the intersection of the extension line of the line segment connecting the eye position in the first coordinate system and the coordinate on the screen disposed in the first coordinate system based on screen data indicating a shape and a position of the screen, and the reference plane set in the first coordinate system.

According to an embodiment of the present application, an image processing device and an image processing method are provided that are capable of reducing a load of the processing executed to display an outside-world image of a moving body on a non-planar screen.

BRIEF DESCRIPTION OF THE DRAWINGS

FIG. 2 is a block diagram illustrating a configuration of a display control system according to one embodiment of the present application.

FIG. 6 is another diagram providing an additional description of image processing to be performed by a processor according to one embodiment of the present application.

FIG. 9 is a conceptual diagram illustrating an example of interpolation processing executed in an embodiment of the present application.

FIG. 11 is a block diagram illustrating a configuration of a display control system according to Modified Example 1 of the present application.

DETAILED DESCRIPTION OF EMBODIMENTS

The following description relates to an image processing device, an image processing method, and an image processing program according to one embodiment of the present application. Note that common or corresponding elements are marked with the same or similar reference codes, and duplicate descriptions are simplified or omitted as appropriate.

Figure 1:
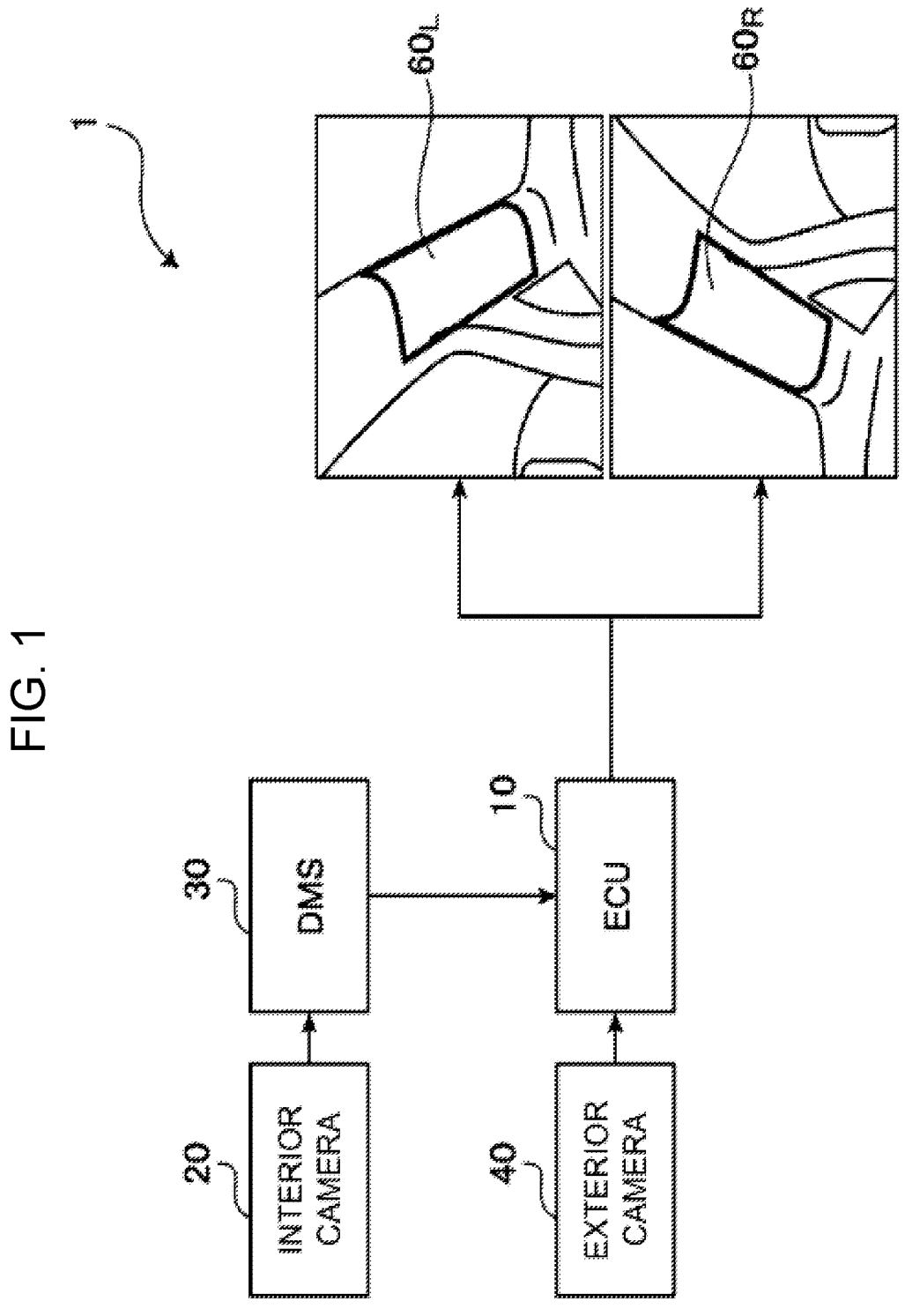
FIG. 1 is a schematic diagram depicting a configuration of a display control system according to one embodiment of the present application.
Figure 2:
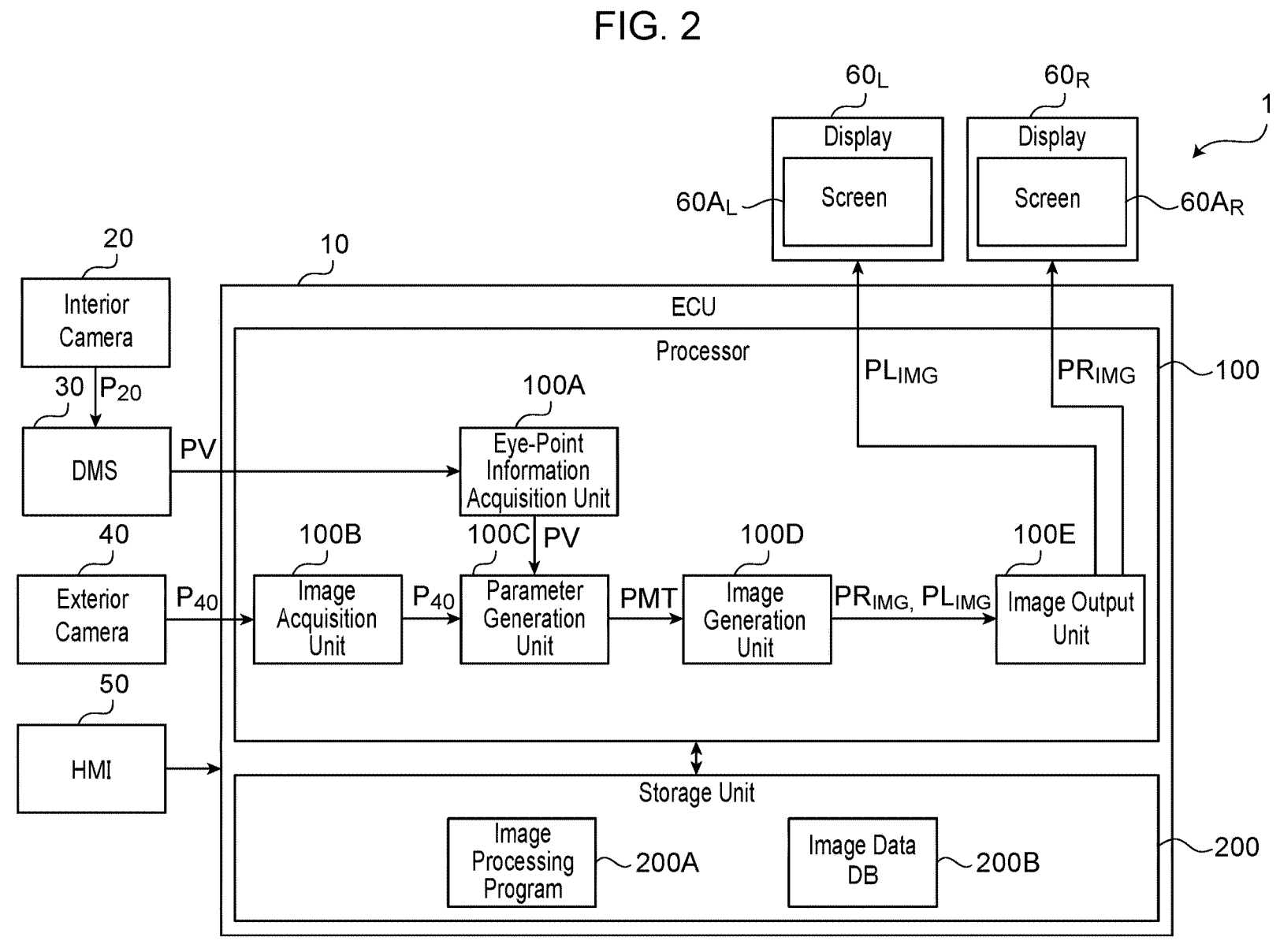

FIG. 1 is a block diagram illustrating a configuration of a display control system 1 according to one embodiment of the present application. FIG. 2 is a block diagram illustrating a configuration of a display control system 1.

The display control system 1 includes an electronic control unit (ECU) 10, an interior camera 20, a driver monitoring system (DMS) 30, an exterior camera 40, a human machine interface (HMI) 50, and display devices $60_R$ and $60_L$. Note that FIG. 1 and FIG. 2 illustrate main components necessary for the description of the present embodiment, and some components, e.g., a housing, are omitted from the drawing as appropriate.

The display control system 1 is a system incorporated in a vehicle traveling on a road (an example of a moving body). Note that the configurations in FIG. 1 and FIG. 2 are illustrated merely by way of examples. For example, the DMS 30 may be incorporated into the ECU 10. In other words, there is a high degree of freedom in the configuration of the display control system 1, and various design changes are possible.

The ECU 10 is an exemplary image processing device and has a processor 100 and a storage device 200. Note that the ECU 10 may be a navigation device or a device that forms part of an in-vehicle infotainment (IVI) device. The image processing device is not limited to an on-board device such as the ECU 10. The image processing device may be in a different form such as a smartphone, a feature phone, a tablet-type terminal device, a personal computer (PC), a personal digital assistant (PDA), a portable navigation device (PND), a handheld game device, and the like.

The processor 100 executes an image processing program 200A stored in the storage device 200. In other words, the processor 100 is an exemplary computer that executes the image processing program 200A.

The processor 100 includes a Random Access Memory (RAM), a flash Read-Only Memory (ROM), and the like, and controls the entire display control system 1. For example, the processor 100 deploys various programs, including the image processing program 200A stored in the storage device 200, on the RAM serving as a work area and controls the display control system 1 in accordance with the deployed programs.

The processor 100 is a single processor or a multiprocessor, for example, and includes at least one processor. When configured to include a plurality of processors, the processor 100 may be packaged as a single device, or it may include multiple devices housed within the ECU 10 but physically separated from each other.

The image processing program 200A stored in the storage device 200 is a program to be executed by the processor 100, which is an exemplary computer connected to the display devices 60$_R$ and 60$_L$, each of which is disposed in the vehicle, i.e., a moving body, and has a screen at least a part of which is non-planar. The image processing program 200A causes the processor 100 to execute a series of processes: acquiring information representing the eye-point of an occupant of the moving body (note that as used herein, the term "eye-point" represents the eye position of the occupant); acquiring an outside-world image showing an outside world of the moving body; generating, in accordance with the information on the eye position, a parameter for generating, from the outside-world image, a display-target image to be displayed on the display devices 60$_R$ and 60$_L$; generating the display-target image from the outside-world image based on the generated parameter; and outputting the generated display-target image to the display devices 60$_R$ and 60$_L$. The parameter mentioned above includes at least the following two elements. A first element is an element of a projective transformation matrix for transforming the coordinates of the outside-world image from a first coordinate system corresponding to the real space into a second coordinate system which is the coordinate system of the outside-world image. A second element is an element of a projective transformation matrix for transforming the coordinates of the screen into the coordinates of the outside-world image of a part of the reference plane corresponding to the area to be displayed on the screen. The latter conversion is performed by specifying the coordinates, on the reference plane, of the intersection, with the reference plane set in the first coordinate system, of the extension line of the line segment connecting the eye position in the first coordinate system and the position with coordinates on the screen arranged in the first coordinate system based on the screen data indicating the shape and the position of the screen.

In other words, the image processing program 200A causes the processor 100 to execute an image processing method that includes the above series of processes.

Executing image processing using the image processing program 200A makes it possible to reduce the load of processing that is executed to display a moving body's outside-world image on a non-planar screen.

Figure 3:
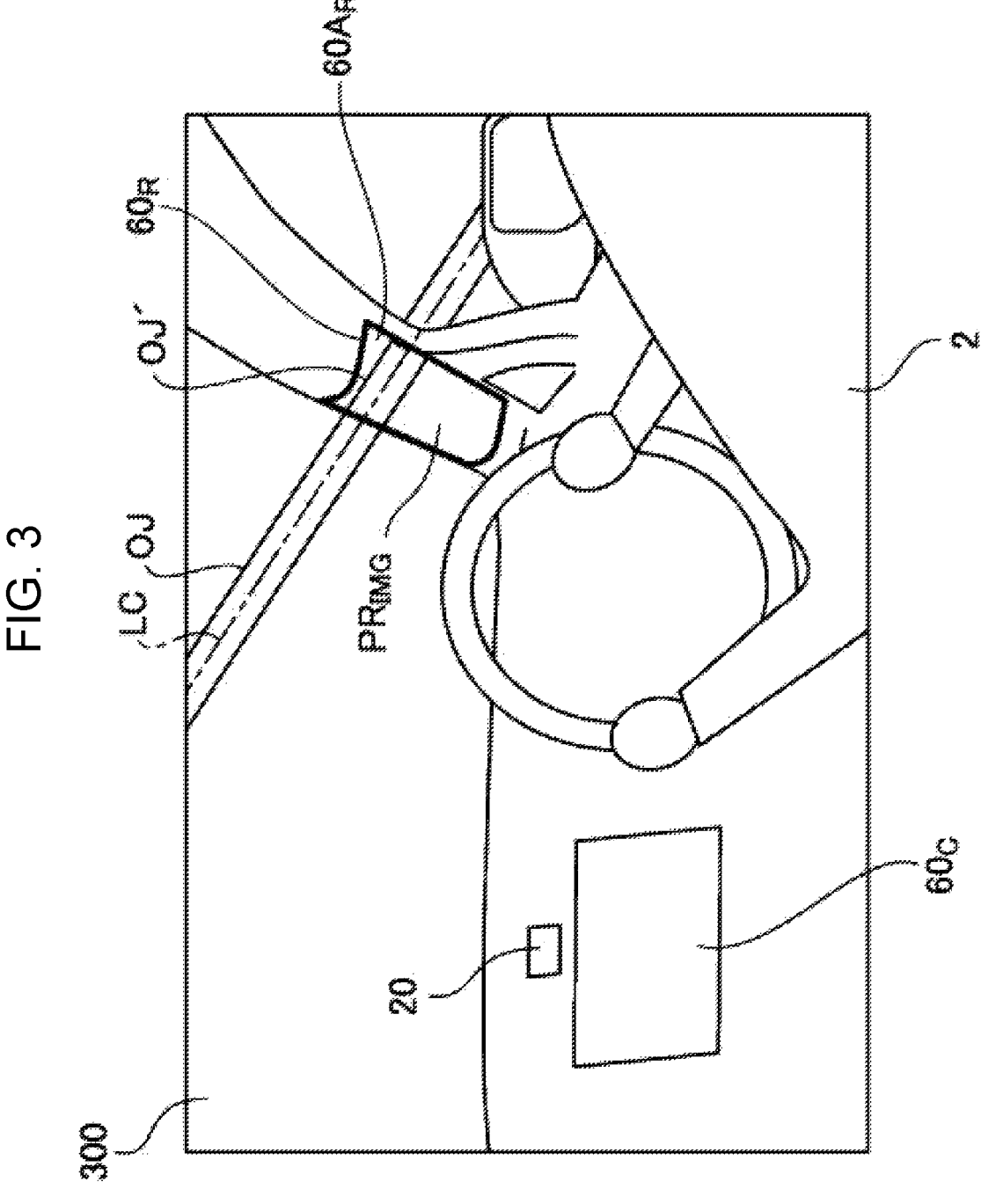
FIG. 3 is a diagram depicting an area around a driver seat of a vehicle in which the display control system is incorporated according to one embodiment of the present application.

FIG. 3 is a diagram depicting an area around a driver seat of a vehicle in which the display control system 1 is incorporated. FIG. 3 is a view seen obliquely forward from the rear seat of the vehicle. The vehicle's interior of FIG. 3 includes the interior camera 20, a display device 60$_C$, the display device 60$_R$, and the windshield 300. The display device 60$_R$ is embedded in a right front pillar portion on the right side of a windshield 300. The display device 60$_L$ is embedded in a left front pillar portion on the left side of the windshield 300.

The interior camera 20 is installed near the display device 60$_C$, for example. The interior camera 20 captures an image of, for example, an occupant 2 seated in the driver seat.

The DMS 30 performs face recognition and eye-point detection of the occupant 2 using an interior image P$_{20}$ captured by the interior camera 20. By way of example, the DMS 30 uses known image recognition technology to execute the processing for recognizing the position of the face of the occupant 2, the orientation of the face, each part of the face including the eyes, motions of the occupant 2 with respect to the face, and the like. Some of the motions of the occupant 2 with respect to the face include, for example, winking, nodding, or the like.

The DMS 30 uses the results of face recognition to detect eye-point coordinates PV, which represent the eye position of the occupant 2. Then, the DMS 30 outputs the coordinates to the processor 100. The eye-point coordinate PV may be the coordinate of a dominant eye (either the right eye or the left eye) of the occupant 2, or may be the midpoint of a line segment connecting the left and right pupils. The occupant 2 can, for example, operate the HMI 50 to pre-input his/her own dominant eye. Note that the DMS 30 may directly detect the eye-point coordinates PV of the occupant 2 from the interior image P20 without using the results of face recognition. Conversely, the DMS 30 may detect the coordinates of the occupant's parts other than the eye position and/or detect the facial contours, and estimate a standard eye position corresponding thereto as the eye-point coordinates PV of the occupant 2.

The exterior camera 40 captures an image of the outside field of the vehicle. By way of example, the exterior camera 40 captures an image of the field in front of and the fields on the sides of the vehicle. The imaging field of view of the vehicle exterior camera 40 includes a blind area hidden behind the right front pillar portion and a blind area hidden behind the left front pillar portion when viewed from the eye-point of the occupant 2, i.e., from the eye position of the occupant 2 (for example, a position slightly in front of the headrest of the driver's seat). The exterior camera 40 outputs the captured vehicle's exterior image P$_{40}$ to the processor 100.

The exterior camera 40, which is an example of an image capture device, may be a camera equipped with a wide-angle lens and thus being capable of capturing a wide angle of view for the purpose of capturing a wide area. The wide-angle lens that the exterior camera 40 is equipped with is, for example, a fish-eye lens. Therefore, the vehicle's exterior image $P_{40}$ captured by the exterior camera 40 is an image with distortion (barrel distortion).

The exterior camera 40 may include either only a single camera or a plurality of cameras. The vehicle's exterior image $P_{40}$ may, for example, be a combination of: the image captured by a front camera operable to image the field in front of the vehicle; and each of the images captures by the corresponding one of a pair of left and right side cameras operable to image the fields on their respective sides of the vehicle.

The HMI 50 may presumably be any of various user interfaces of hardware, software, or a combination thereof. By way of example, the HMI 50 is a mechanical switch key installed on a dashboard or a remote controller. When the display device 60$_C$ is equipped with a touch panel, the graphical user interface (GUI) provided in a touch panel environment also forms a part of the HMI 50. The occupant 2 can operate the display control system 1 via the HMI 50.

The display device 60$_C$ is, for example, a liquid crystal display (LCD) device with a touch panel and is installed on the dashboard. The display devices 60$_R$ and 60$_L$ are also LCD devices, and are installed in the right front pillar portion and in the left front pillar portion, respectively. These display devices are not limited to LCD devices, but may be another form of display devices, for example, an organic electro luminescence (EL) display device or the like.

In the illustration of FIG. 3, the linearly extending object OJ exists outside the vehicle. In this example, a high-precision output image $PR_{IMG}$ corresponding to the eye-point of the occupant 2 is displayed on the screen 60A$_R$ of the display 60$_R$ installed in the right front pillar portion. Therefore, as illustrated in FIG. 3, a part of the object OJ which is visible via the windshield 300, and a part of the object OJ which is displayed on the screen 60A$_R$ (referred to as OJ' for the convenient sake) are aligned with each other in a straight line. The occupant 2 can visually recognize, via the screen 60A$_R$, the blind area that cannot otherwise be seen directly.

In FIG. 3, the center line of the object OJ is denoted by a reference symbol LC. As illustrated in FIG. 3, the center line LC of the object OJ coincides with the center line of the object OJ' displayed on the screen 60A$_R$. As the object OJ and the object OJ' appears to be a continuous linear-shaped object, the output image $PR_{IMG}$ appearing on the screen 60A$_R$ can be perceived by the occupant 2 as a natural image.

In this way, the screen 60A$_R$ displays the output image $PR_{IMG}$ that is similar to the scene of the outside of the vehicle viewed from the eye-point of the occupant 2 as if the same scene were viewed through the installation region of the screen 60A$_R$. The screen 60A$_L$ of the display apparatus 60$_L$ also displays an output image $PL_{IMG}$ that is similar to the scene of the outside of the vehicle viewed from the eye-point of the occupant 2 as if the same scene were viewed through the installation region of the screen 60A$_L$.

Hereinafter, for convenience's sake, the display device 60$_R$ and the display device 60$_L$ may be collectively referred to as a "display device 60." The screen 60A$_R$ and the screen 60A$_L$ may be collectively referred to as a "screen 60A." The output image $PR_{IMG}$ and the output image $PL_{IMG}$ may be collectively referred to as an "output image $P_{IMG}$."

In the present embodiment, the occupant 2 can be made to perceive the scene of the outside the vehicle shown in the screen 60A as a part of the scene of the real world. Since the occupant 2 can view the scene behind the front pillar portion, the occupant 2 can be made to perceive as if the front pillar portion were transparent.

It should be noted that the display device 60 is a curved-screen display device having a curved screen. In other words, the display device 60 is an exemplary display device disposed in a vehicle (an example of a moving body) and having a screen at least a part of which is non-planar.

Conventionally, an enormous amount of computation is necessary for a display device having a complicated screen shape such as a curved-screen display device to draw a vehicle's exterior image that is deemed natural. What is thus required is an image processing device having high processing capacity, which needs an increased cost.

Therefore, for the purpose of reducing the load of processing on the processor 100 to display, on the display apparatus 60, the high-precision image $P_{IMG}$ matching the eye-point of the occupant 2, the ECU10 according to the present embodiment has the following configuration.

The processor 100 includes, as functional blocks, an eye-point information acquisition unit 100A, an image acquisition unit 100B, a parameter generation unit 1000, an image generation unit 100D, and an image output unit 100E. Each functional block is realized by the image processing program 200A executed by the processor 100. Each functional block may be partially or wholly implemented by hardware such as a dedicated logic circuit, or the like.

The eye-point information acquisition unit 100A acquires information on the eye-point of the occupant 2. By way of example, the eye-point information acquisition unit 100A acquires the eye-point coordinates PV from the DMS 30. It should be noted that the eye-point coordinates PV may be set, for example, by an operation on the HMI 50 by the occupant 2. In this case, the DMS 30 can be omitted from the display control system 1.

The image acquisition unit 100B acquires a vehicle's exterior image $P_{40}$ captured by the exterior camera 40 (an example of an outside-world image showing the outside world of the moving body).

The parameter generation unit 100C generates, in accordance with the eye-point coordinates PV (an example of information on the eye-point), a parameter PMT for generating, from the vehicle's exterior image $P_{40}$, an output image $P_{IMG}$ (an example of a display-target image) to be displayed on the display apparatus 60. More specifically, the parameter PMT generates, from the vehicle's exterior image $P_{40}$, a first parameter PMT for generating: the output image $PR_{IMG}$ to be displayed on the display device 60$_R$; and a second parameter PMT for generating the output image $PL_{IMG}$ to be displayed on the display device 60$_L$.

Based on the first and second parameters PMT generated by the parameter generation unit 1000, the image generation unit 100D generates the output images $PR_{IMG}$ and $PL_{IMG}$ from the vehicle's exterior image $P_{40}$.

The image output unit 100E outputs the output images $PR_{IMG}$ and $PL_{IMG}$ generated by the image generation unit 100D to the display devices 60$_R$ and 60$_L$, respectively.

The output image $PR_{IMG}$ as illustrated in FIG. 3 is displayed on the screen 60A$_R$ of the display device 60$_R$. Although not illustrated in FIG. 3, as is the case with the screen 60A$_R$, the screen 60A$_L$ of the display apparatus 60$_L$ also displays the output image $PL_{IMG}$ that is similar to the scene of the outside of the vehicle viewed from the eye-point of the occupant 2 as if the same scene were viewed through the installation region of the screen 60A$_L$.

As will be described in detail later, the parameter PMT includes at least the following two elements. A first element is an element of a projective transformation matrix for transforming the coordinates on a reference plane set in a real space from a first coordinate system corresponding to the real space into a second coordinate system which is the coordinate system of the vehicle's exterior image P$_{40}$. A second element is an element of a projective transformation matrix for transforming the coordinates of the screen 60A$_R$ (or the screen 60A$_L$) into the coordinates of the vehicle's exterior image P$_{40}$ of a part of the reference plane corresponding to the area to be displayed on the screen 60A$_R$ (or the screen 60A$_L$). The latter conversion is performed by specifying the coordinates, on the reference plane, of the intersection, with the reference plane set in the first coordinate system, of the extension line of the line segment connecting the eye-point coordinates PV in the first coordinate system and the coordinates on the screen 60A$_R$ (or the screen 60A$_L$) arranged in the first coordinate system based on the screen data indicating the shape and the position of the screen 60A$_R$ (or the screen 60A$_L$).

In other words, the processor 100 generates the above-described parameter PMT including the elements of the projective transformation matrix in real time in accordance with the eye-point coordinates PV. Use of such a parameter PMT enables the high-accuracy output image P$_{IMG}$ that is changing in real time in accordance with the eye-point of the occupant 2 to be displayed on the screen 60A$_R$ and the screen 60A$_L$ of their respective display devices 60$_R$ and 60$_L$, which are curved-screen display devices, at a lower computation cost than the cost needed in the conventional technique.

Figure 4:
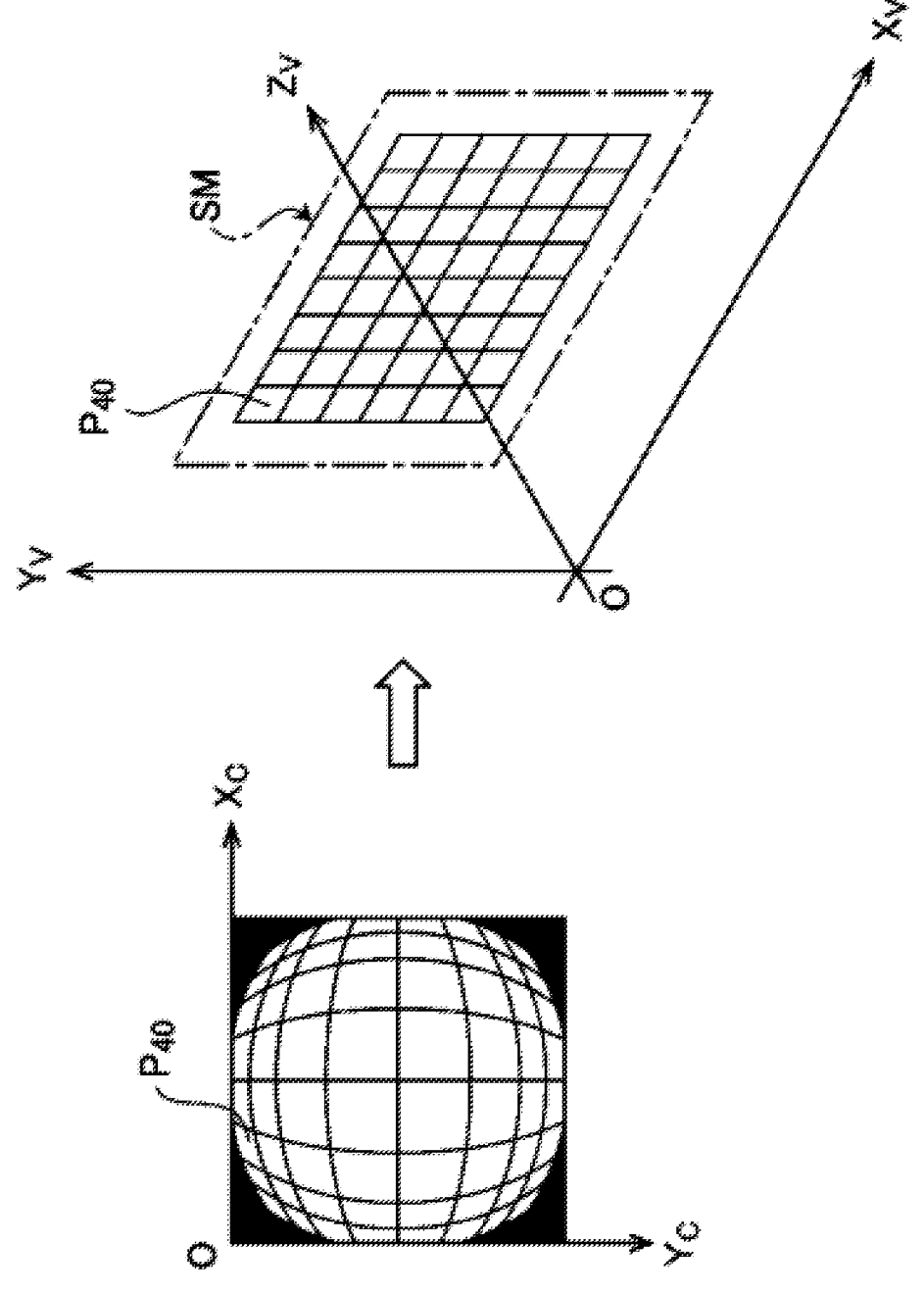
FIG. 4 is a diagram providing an additional description to image processing to be performed by a processor according to one embodiment of the present application.
Figure 5:
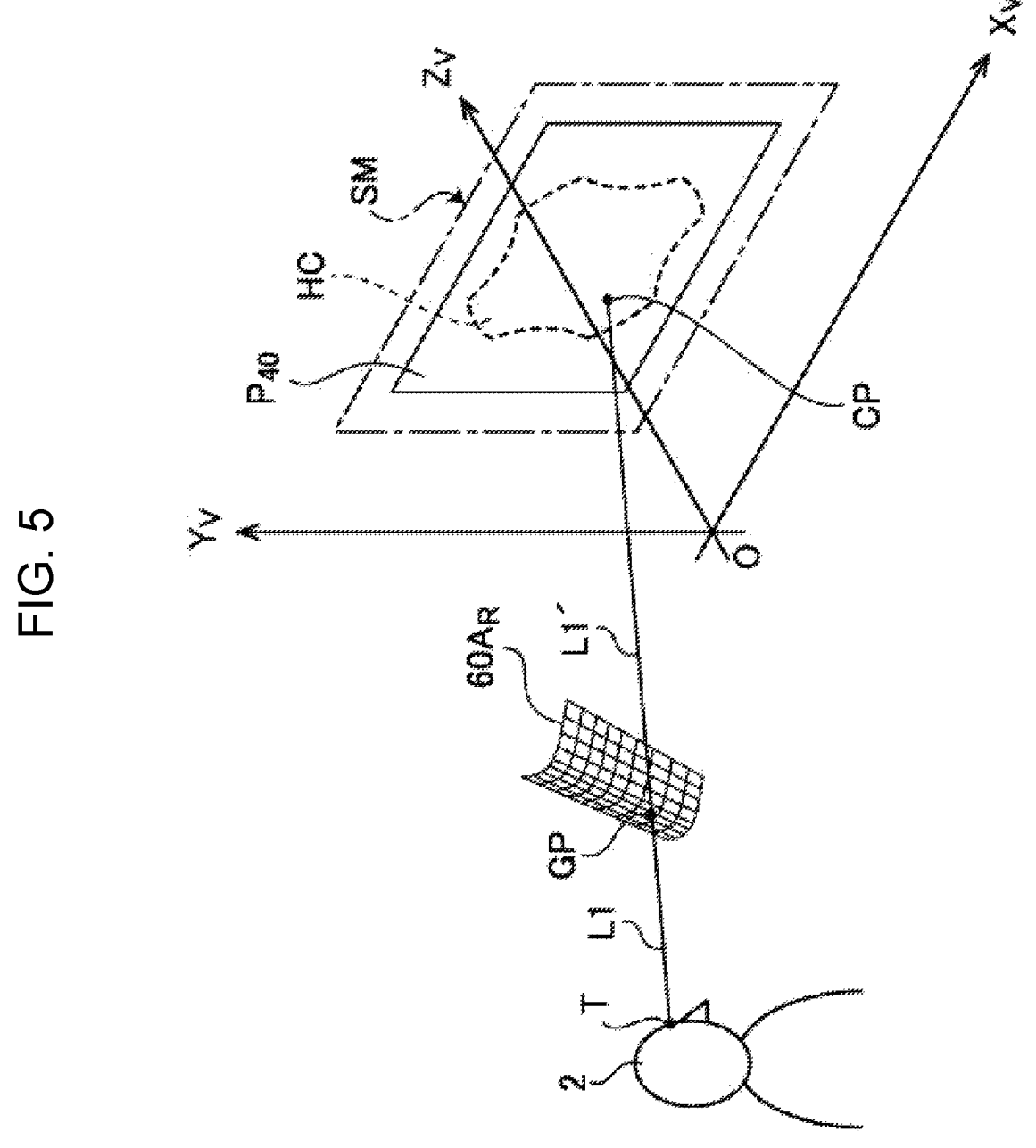
FIG. 5 is another diagram providing an additional description of image processing to be performed by a processor according to one embodiment of the present application.

FIGS. 4 to 6 are diagrams providing additional descriptions to the image processing to be performed by the processor 100 (in particular, the parameter generation unit 100C and the image generation unit 100D). A method of generating the output image PR$_{IMG}$ to be outputted to the display device 60$_R$ will be described with reference to these figures. A method of generating the output image PL$_{IMG}$ is not provided to avoid redundancy in description.

The vehicle coordinate system is an exemplary first coordinate system corresponding to the real space, and is represented by three axes of X$_V$, Y$_V$, and Z$_V$ as illustrated in FIG. 4, for example. The vehicle coordinate system is a coordinate system based on the vehicle in which the display control system 1 is incorporated, and is a 3D coordinate system with the position where the vehicle is located as the origin O. The axis X$_V$ extends in a vehicle width direction. The axis Y$_V$ extends in a vehicle up-down direction. The axis Z$_V$ extends in a vehicle front-rear direction. The unit for each axis is millimeters (mm).

The image coordinate system is an exemplary second coordinate system that is a coordinate system of an outside-world image, and is represented by two axes of a horizontal axis X$_C$ and a vertical axis Y$_C$ as illustrated in FIG. 4, for example. The image coordinate system is a coordinate system based on the vehicle's exterior image P$_{40}$, and is a two-dimensional coordinate system with the origin O at the upper left corner of the vehicle's exterior image P$_{40}$. The unit for each axis is pixels (px).

The reference plane SM is a virtual plane set in the vehicle coordinate system, and is a vertical plane that is parallel to the axis Y$_V$ as illustrated in FIG. 4, for example. By way of example, a vertical plane separated forward from the vehicle by a predetermined distance is set as the reference plane SM.

In addition, for example, the processor 100 may perform image recognition processing, and a position of a vertical surface (a wall surface or the like) recognized by this processing may be set as the reference plane SM. The reference plane SM is not limited to a vertical plane. A horizontal plane (e.g., a ground surface or the like) may be set as the reference plane SM. Alternatively, an obliquely inclined plane may be set as the reference plane SM.

The screen 60A$_R$ illustrated in FIG. 5 is arranged in the vehicle coordinate system and is a plane that the output image PR$_{IMG}$ is projected onto.

It should be noted that the storage device 200 of the ECU10 stores a screen-data database 200B. The screen-data database 200B includes screen data of each screen such as the screen 60A$_R$ and the screen 60A$_L$. The screen data include information on the shape and the position of the screen in the vehicle coordinate system. The screen 60A$_R$ illustrated in FIG. 5 is defined in the vehicle coordinate system on the basis of the screen data of the screen 60A$_R$.

The coordinates of the screen 60A$_R$ in the vehicle coordinate system are obtained by geometric calculation based on, for example, minimum information required to define a curved surface. The coordinates of the screen 60A$_R$ may be obtained by referring to the coordinate array elements in the vehicle coordinate system. In any case, the coordinates of the screen 60A$_R$ are obtained from the screen data of the screen 60A$_R$.

The shape (including the size) of the display device is different from one product to another, for example. In addition, the installation position of the display device is different from one vehicle model to another. Hence, the screen-data database 200B may store a plurality of types of screen data corresponding to display devices of various shapes and of various installation positions. By storing various types of screen data in advance, the screen data to be applied in the image processing conducted by the processor 100 (in other words, the screen to be arranged in the vehicle coordinate system based on the screen data) can be switched in accordance with the product and the model of the vehicle.

The screen-data database 200B is an exemplary storage unit that stores a plurality of types of image data.

The screen data may be provided on a network instead of locally, for example. In this case, the processor 100 accesses the screen-data database on the network via a moving body wireless communication unit (not illustrated) to download the screen data.

Figure 7:
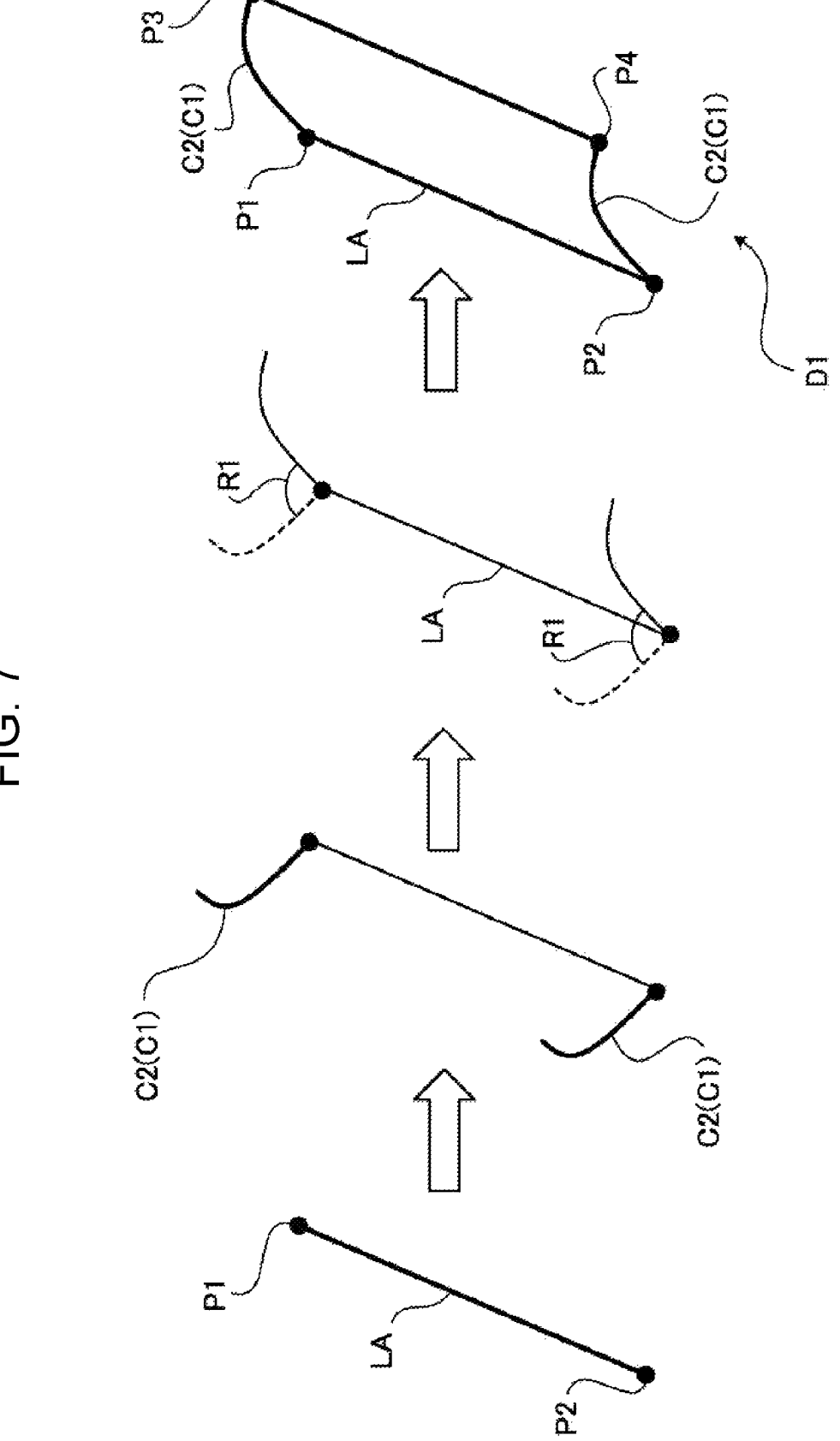
FIG. 7 is a conceptual diagram describing an example of screen data of a display device according to one embodiment of the present application.
Figure 8:
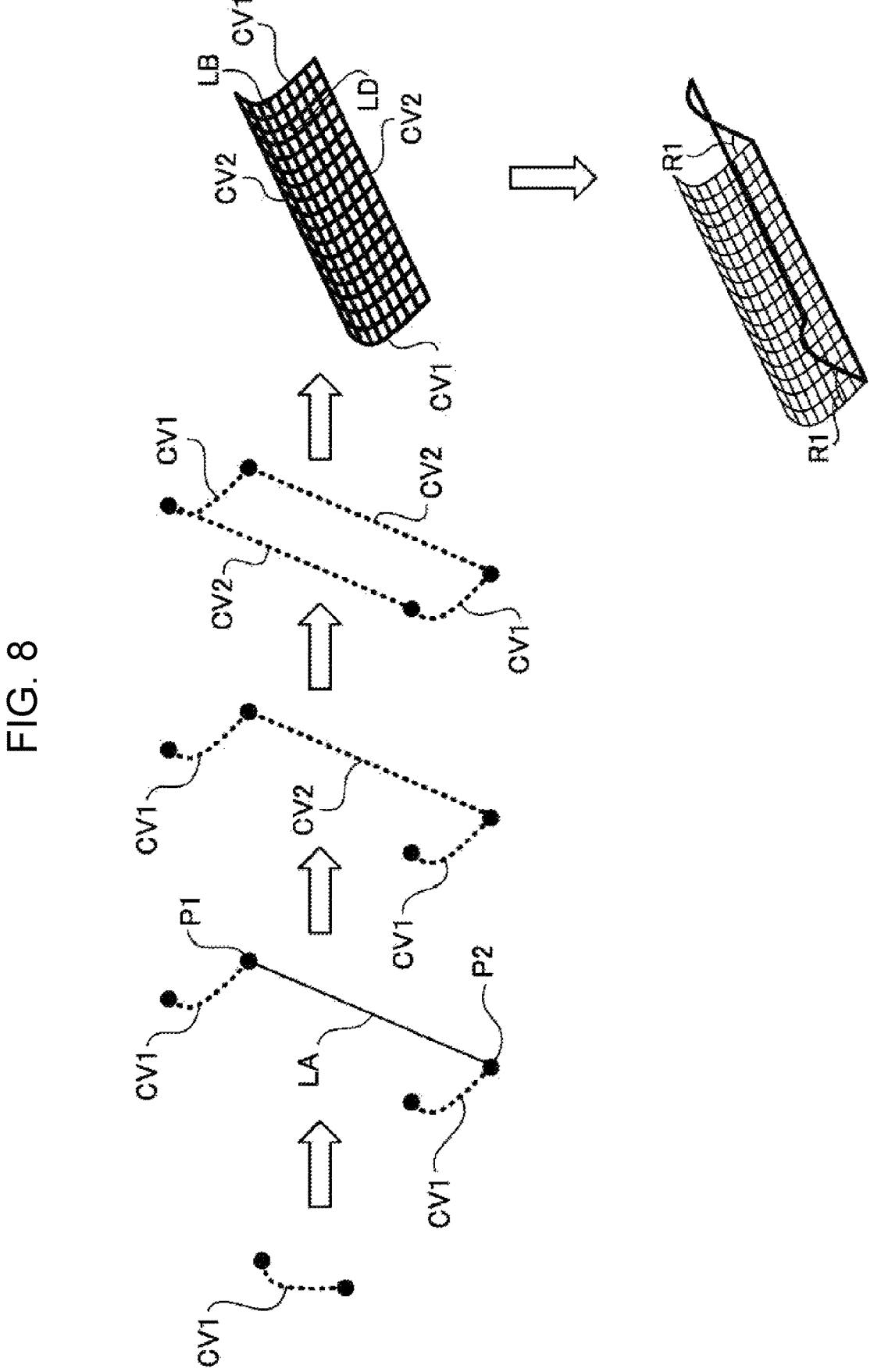
FIG. 8 is another conceptual diagram describing an example of screen data of a display device according to one embodiment of the present application.

FIGS. 7 and 8 are conceptual diagrams describing an example of screen data D1 of the screen 60A$_R$.

As conceptually illustrated in FIG. 7, the screen data D1 of the screen 60A$_R$ include: at least two point data P1 and P2 (three-dimensional coordinate data) defining a vertical side of the screen 60A$_R$; curve data C1 defining a curved surface (for example, data on a Bezier curve drawn either in a two-dimensional space or in a three-dimensional space); and rotation angle data R1, which are data on the angle of rotation relative to the curve.

In the example of FIG. 7, the point data P1 and P2 are used to define the position and the length of one vertical side of the screen 60A$_R$ in the vehicle coordinate system. For convenient sake, a line segment connecting the point data P1 and the point data P2 is denoted by a reference symbol LA. The curve data C1 are used to define the shape and the length of the curved upper and lower sides that are orthogonal to the vertical side. For convenient sake, the curve defined by the curve data C1 is denoted by the reference symbol C2. The rotation angle data R1 is used to define the orientation of each of the curved upper and lower sides. By connecting the end points P3 and P4 of the curve data C1, information on the shape and the position of the screen 60A$_R$ is obtained.

In this way, the screen data of the substantially rectangular screen 60A$_R$ formed in a curved-surface shape that is curved in the vertical-side direction (an example of the first direction) include: information on the curved shape in the vertical-side direction; information on the linear shape in the perpendicular-side direction (an example of the second direction) that is orthogonal to the vertical-side direction; and information on the installation angle (that is, the curved data C1, the point data P1 and P2, and the rotation angle data R1).

In order to define a more accurate curved-surface shape, as conceptually illustrated in FIG. 8, the shape and the position of the screen 60A$_R$ are obtained by geometric calculation based on the curve data C1, the point data P1 and the point data P2, and the rotation angle data R1.

In this geometric calculation, an array of coordinates of the grid points on the screen 60A$_R$ (in other words, the curved surface defined by the screen data D1) is obtained. In order to reduce the load of processing, an array of the coordinates of the grid points corresponding to some pixels discretely arranged at regular intervals are obtained instead of the array of the coordinates of the grid points corresponding to all pixels. The array of coordinates of the grid points obtained here correspond to the coordinate group D indicated by each grid point on the output image PR$_{IMG}$ illustrated in FIG. 6.

As illustrated in FIG. 8, the curve C2 defined by the curve data C1 is divided into n equal parts. This value of n is obtained by subtracting 1 from the number of grid points in the perpendicular-side direction. The coordinates of both end points of the curve C2 and the coordinates of each division point of the curve C2 divided into n equal parts are calculated.

The division point group CV1 on the curve C2 calculated above is replicated. The division point group CV1 of the replication source is moved so that one end point of the division point group CV1 of the replication source is positioned at the point data P1, and the division point group CV1 of the replication is moved so that one end point of the division point group CV1 of the replication is positioned at the point data P2. It should be noted that the direction of the division point group CV1 of the replication source is determined so that the line segment LA connecting the point data P1 and the point data P2 is orthogonal to the curve C2 formed by the division point group CV1. The replicated division point group CV2 is oriented in the same orientation as that of the division point group CV1 of the replication source.

The line segment LA is equally divided into m segments. This value of m is obtained by subtracting 1 from the number of grid points in the vertical-side direction. The coordinates of both end points of the line segment LA and the coordinates of each division point of the line segment LA divided into m equal parts are calculated.

The division point group CV2 on the line segment LA calculated above is replicated. To be more specific, the division point group CV2 is replicated so that the point data P1 are located at the other end point of one division point group CV1 and the point data P2 are located at the other end point of the other division point group CV1.

A line segment LB is defined along the vertical sides by connecting the opposed arrangement points of a pair of division point groups CV1. A line segment LD is defined along the perpendicular sides by connecting the opposed arrangement points of a pair of division point groups CV2.

The coordinates of all the grid points are calculated where each line segment LB and each line segment LD intersect, that is, an array of the coordinates of the grid points is calculated.

The array of coordinates of the grid points is rotated in the vehicle coordinate system in accordance with the rotation angle data R1. As a result, the array of coordinates of the grid points is obtained as the screen data D1 including information on the shape and the position of the screen 60A$_R$.

In the image processing by the processor 100, the output image PR$_{IMG}$ is generated from the vehicle's exterior image P$_{40}$ using the following equation. In addition, a coordinate group D' of the vehicle's exterior image P$_{40}$ which corresponds to the grid point group (coordinate group D) of the output image PR$_{IMG}$, and which satisfies the following equation (1), is calculated.

$$D' = f(HD) \qquad \text{Equation (1)}$$

D: a coordinate group representing a pixel on the output image PR$_{IMG}$

H: projective transformation matrix M×projective transformation matrix N f: function for transforming the coordinates on the vehicle's exterior image P$_{40}$ after removing the barrel distortion into the corresponding coordinates on the vehicle's exterior image P$_{40}$ before removing the barrel distortion D': a coordinate group on the vehicle's exterior image P$_{40}$ corresponding to the coordinate group D The formula (1) will be described specifically below.

The coordinate group D is a matrix in which coordinates of a two-dimensionally expanded coordinate system (an example of a third coordinate system) of the screen 60A$_R$ are horizontally arranged. The coordinate system of the screen 60A$_R$ is indicated by two axes, X$_D$ on the horizontal axis and Y$_D$ on the vertical axis. The coordinate system of the screen 60A$_R$ is a two-dimensional coordinate system based on the screen 60A$_R$, with the origin O in the upper left corner of the screen 60A$_R$. The unit for each axis is pixels (px).

The coordinate group D does not represent a coordinate group of all pixels, but it represents a coordinate group of some pixels corresponding to the screen data D1 (i.e., an array of coordinates of grid points corresponding to some pixels discretely arranged at regular intervals). In addition, the processor 100 holds in advance the correspondence between the coordinates of each grid point indicating the coordinate group D and the corresponding coordinates GP in the vehicle coordinate system (in other words, grid points on the screen 60A$_R$ defined by the screen data D1).

The projective transformation matrix H is a product of the projective transformation matrix M and the projective transformation matrix N.

The projective transformation matrix N is used to transform the grid points on the screen 60A$_R$ defined by the screen data D1 (in other words, the coordinates of the grid points representing the coordinate group D) into the coordinates on the reference plane SM set in the vehicle coordinate system.

In FIG. 5, the projection center T indicates the projection center of the output image PR$_{IMG}$ projected on the screen 60A$_R$. In the present embodiment, the eye-point coordinates PV of the occupant 2 in the vehicle coordinate system are set as the projection center T.

The processor 100 specifies which area on the reference plane SM set in the vehicle coordinate system is to be projected onto the screen 60A$_R$ with the projection center T used as the reference point. In particular, the processor 100 obtains a line segment L1 connecting the projected center T and one of the grid points GP indicating the coordinates of the screen 60A$_R$. The processor 100 obtains coordinates CP of a point on the reference plane SM at which the extension line L1' of the line segment L1 intersects the reference plane SM. By obtaining the coordinates CP on the reference plane SM corresponding to each grid point GP, the area HC corresponding to the screen 60A$_R$ is specified.

It should be noted that the shape of the reference plane SM and that of the area HC illustrated in FIG. 5 are merely conceptual and not accurate.

Hence, the projective transformation matrix N is a factor for projectively transforming the grid points GP on the screen 60A$_R$ into the coordinates CP on the reference plane SM. The coefficients of the projective transformation matrix N are determined in accordance with the projection center T (eye-point coordinates PV). In a case where the reference plane SM dynamically changes in accordance with an object appearing in the vehicle's exterior image P$_{40}$ instead of being fixed at a specified position in the vehicle coordinate system, the coefficients of the projective transformation matrix N are determined in accordance with the projection center T (eye-point coordinates PV) and the reference plane SM.

In this way, the processor 100 performs projective transformation of each grid point GP into its corresponding coordinates CP using the projective transformation matrix N.

It should be noted that the homogeneous coordinates (x$_V$, y$_V$) on the reference plane SM of the vehicle coordinate system are denoted by the reference symbol P$_V$. The homogeneous coordinates representing coordinates (x$_D$, y$_D$) on the screen 60A$_R$ corresponding to the coordinates (x$_V$, y$_V$) are denoted by the reference symbol P$_D$. The relationship between the homogeneous coordinates P$_V$ and P$_D$ is expressed by the following equation (2).

$$\begin{pmatrix} \lambda_V x_V \\ \lambda_V y_V \\ \lambda_V \end{pmatrix} = N \begin{pmatrix} x_D \\ y_D \\ 1 \end{pmatrix} \qquad \text{Equation (2)}$$

Using the projective center T (the eye-point coordinates PV) as the center of the projection, a projective transformation matrix is calculated that is to be used when the points of the grid points GP on the screen 60A$_R$ is projected onto the reference plane SM as the plane of projection. The projective transformation matrix thus obtained is used as the projective transformation matrix N. It should be noted that values λ$_V$ and λ$_D$ represent the magnification factors at their respective homogeneous coordinates P$_V$ and P$_D$. Regardless of the values λ$_V$ and λ$_D$, other than 0, each homogeneous coordinate represents the same coordinate on each coordinate system.

Each grid point GP (in other words, the corresponding coordinates of the coordinate group D) is transformed into a coordinates CP on the reference plane SM by the above equation (2) using the projective transformation matrix N.

Using the projective transformation matrix M, individual coordinates CP on the reference plane SM are transformed into coordinates CP' on the vehicle's exterior image P$_{40}$ from which the barrel distortion has been removed (in other words, into coordinates in the image coordinate system).

It should be noted that the homogeneous coordinates (x$_V$, y$_V$) on the reference plane SM of the vehicle coordinate system are denoted by the reference symbol P$_V$. The homogeneous coordinates representing coordinates (x$_C$, y$_C$) of the image coordinate system corresponding to the coordinates (x$_V$, y$_V$) are denoted by the reference symbol P$_C$. The relationship between the homogeneous coordinates P$_V$ and P$_C$ is expressed by the following equation (3).

$$\begin{pmatrix} \lambda_C x_C \\ \lambda_C y_C \\ \lambda_C \end{pmatrix} = M \begin{pmatrix} \lambda_V x_V \\ \lambda_V y_V \\ \lambda_V \end{pmatrix} \qquad \text{Equation (3)}$$

Pairs of points P$_V$ and P$_C$ corresponding to each other are identified by actual measurement. By substituting the coordinates of these identified points into the equation (3) and solving a simultaneous equations involving individual elements of the projective transformation matrix M, the projective transformation matrix M is calculated. Values λ$_V$ and λ$_C$ represent the magnification factors at their respective homogeneous coordinates P$_V$ and P$_C$. Regardless of the values λ$_V$ and λ$_C$, other than 0, each homogeneous coordinate represents the same coordinate on each coordinate system. The projective transformation matrix M is calculated by assuming that the values λ$_V$ and λ$_C$ are 1.

Individual coordinates CP on the reference plane SM set in the vehicle coordinate system are transformed into coordinates CP' in the image coordinate system by the above-mentioned equation (3) using the projective transformation matrix M.

The product H of the projective transformation matrix M and projective transformation matrix N (i.e., H=MN) becomes a projective transformation matrix that transforms the coordinates (x$_C$, y$_C$) of the image coordinate system into the coordinates (x$_D$, y$_D$) of the screen 60A$_R$. The relational expression using the projective transformation matrix H is as expressed in the equation (4) below. By obtaining the projective transformation matrix H in advance, the coordinate transformation between the coordinates of the image coordinate system and the coordinates of the screen 60A$_R$ is easily performed.

$$\begin{pmatrix} \lambda_C x_C \\ \lambda_C y_C \\ \lambda_C \end{pmatrix} = H \begin{pmatrix} x_D \\ y_D \\ 1 \end{pmatrix} \qquad \text{Equation (4)}$$

$$H = MN$$

Further, a function f obtained in advance is used to transform the vehicle's exterior image P$_{40}$ after the removal of the barrel distortion into the vehicle's exterior image P$_{40}$ before the removal of the barrel distortion, that is, the original image captured by the exterior camera 40. Thus, the coordinate group D' of the vehicle's exterior image P$_{40}$ corresponding to the grid point group (coordinate group D) of the output image PR$_{IMG}$ is calculated. In short, the above-mentioned equation (1) is used to calculate the coordinate group D' of the vehicle's exterior image P$_{40}$ corresponding to the grid point group (coordinate group D) of the output image PR$_{IMG}$.

In this way, in the present embodiment, the projective transformation matrix H is used to perform high-precision coordinate transformation among the image coordinate system, the vehicle coordinate system, and the coordinate system of the screen $60A_R$. Thus, generated from the vehicle's exterior image $P_{40}$ is a highly accurate output image $R_{IMG}$ that is adapted to the eye-point of the occupant 2. This allows the scene that the occupant 2 visually recognizes through the windshield 300 and the output image $PR_{IMG}$ displayed on the screen $60A_R$ to be displayed continuously, as depicted in FIG. 3, for example. As a result, the output image $PR_{IMG}$ displayed on the screen $60A_R$ can be perceived by the occupant 2 as a natural image.

The parameter PMT generated by the parameter generation unit 100C is an element for calculating the coordinate group D' of the vehicle's exterior image $P_{40}$ corresponding to the grid point group (coordinate group D) of the output image $PR_{IMG}$, being included in the equation (1).

Hence, the parameter PMT includes at least the following two elements. A first element is an element of a projective transformation matrix for transforming the coordinates on a reference plane set in a real space from a first coordinate system corresponding to the real space into a second coordinate system which is the coordinate system of the vehicle's exterior image $P_{40}$ (the first element being the projective transformation matrix M). A second element is an element of a projective transformation matrix for transforming the coordinates of the screen $60A_R$ into the coordinates of the vehicle's exterior image $P_{40}$ of a part of the reference plane SM corresponding to the area HC to be displayed on the screen $60A_R$ (the second element being the projective transformation matrix N). The latter conversion is performed by specifying the coordinates, on the reference plane SM, of the intersection, with the reference plane SM set in the first coordinate system, of the extension line L1' of the line segment L1 connecting the eye-point coordinates PV in the first coordinate system and the coordinates on the screen $60A_R$ arranged in the first coordinate system based on the screen data indicating the shape and the position of the screen $60A_R$. In addition, the parameter PMT further includes an element (function f) for removing the barrel distortion of the vehicle's exterior image $P_{40}$ to transform the coordinates of the vehicle's exterior image $P_{40}$ from the second coordinate system to the first coordinate system.

In the present embodiment, use of such a parameter PMT can reduce the cost for the computation that is executed to perform highly accurate coordinate transformation between the coordinate systems and thus to display a natural vehicle's exterior image reproducing a real scene on a screen (non-planar surface) having a complicated shape such as the screen $60A_R$. Hence, the processing load on the processor 100 is reduced greatly.

As described above, the parameter PMT is used to transform the coordinates of the vehicle's exterior image $P_{40}$ from the image coordinate system into the vehicle coordinate system and to transform the coordinates within the area HC into the coordinates on the screen $60A_R$, provided that the target of the transformations described above is some of the pixels discretely arranged at regular intervals.

The image generation unit 100D performs interpolation processing based on information on the coordinate group D' of the vehicle's exterior image $P_{40}$ corresponding to the grid point group (the coordinate group D) of the output image $PR_{IMG}$ (the above-mentioned information being an example of information on some of the pixels included in the display-target image) generated based on the parameter PMT. The image generation unit 100D thus acquires information on all the pixels of the display-target image.

FIG. 9 is a conceptual diagram illustrating an example of interpolation processing executed by the image generation unit 100D. As conceptually illustrated in FIG. 9, the image generation unit 100D performs interpolation processing based on the information on the coordinate group D' of the vehicle's exterior image $P_{40}$ corresponding to the grid point group (coordinate group D) of the output image $PR_{IMG}$.

The image generation unit 100D performs interpolation of pixel coordinates by, for example, a known method. To interpolate the information of the missing pixel, the image generation unit 100D uses such methods as the nearest neighbor interpolation, the bilinear interpolation, the bicubic interpolation, or the like. Thus, obtained is the information on all pixels to be displayed on the screen $60A_R$.

In the present embodiment, processing involving high-precision coordinate transformation is executed only for some of the pixels. Therefore, the processing load on the processor 100 is greatly reduced as compared to the case where the coordinate transformation processing or the like is executed for all the pixels.

Figure 10:
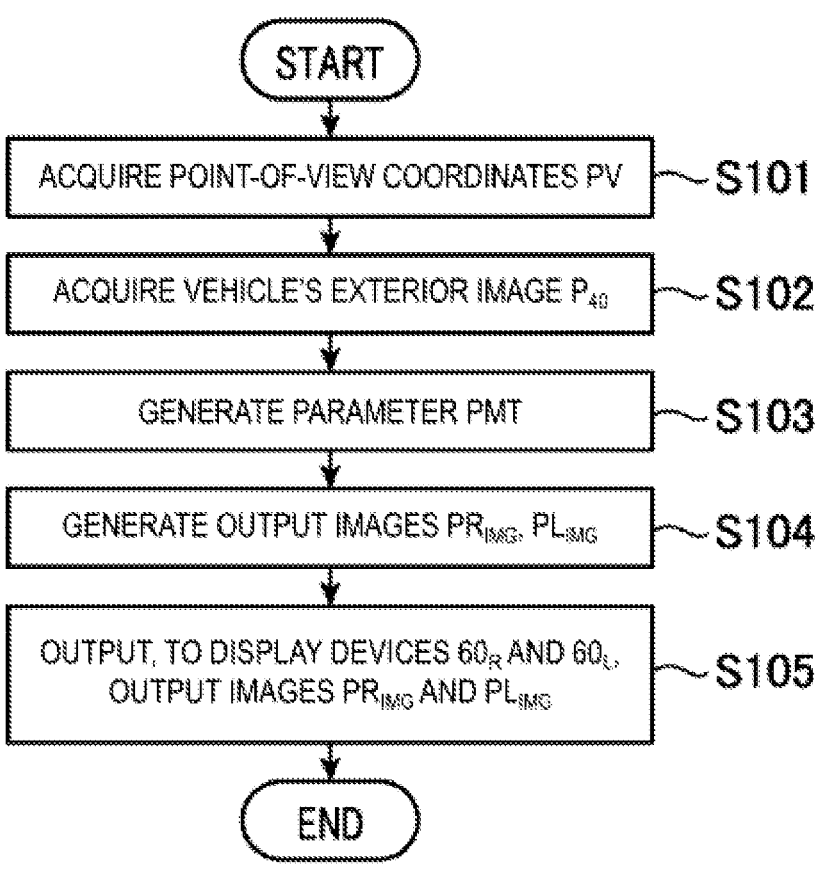
FIG. 10 is a flowchart illustrating image processing executed by a processor in one embodiment of the present application.

FIG. 10 is a flowchart illustrating image processing executed by a processor 100. For example, when the display control system 1 starts up, the system begins executing the image processing illustrated in FIG. 10. The image processing is repeated at a prescribed rate (e.g., a plurality of times per second) until, for example, the display control system 1 stops.

It should be noted that the embodiments are not limited by the manner in which the processing units of the flowchart are divided or the names of the processing units. In addition, the order of processes illustrated in the flowchart is not limited to the illustrated order.

As illustrated in FIG. 10, the processor 100 acquires the eye-point coordinates PV of the occupant 2 detected by the DMS 30 (Step S101).

Thus, in Step S101, the processor 100 operates as an eye-point information acquisition unit 100A to acquire the eye-point coordinates PV of the occupant 2 (an example of information on the eye positions of the occupant).

The processor 100 acquires the vehicle's exterior image $P_{40}$ captured by the exterior camera 40 (Step S102).

Thus, in Step S102, the processor 100 operates as an image acquisition unit 100B to acquire the vehicle's exterior image $P_{40}$ (an example of an outside-world image) showing the outside world of the vehicle (an example of a moving body).

The processor 100 generates the parameter PMT in accordance with the eye-point coordinates PV acquired in Step S101 (Step S103).

As described above, in Step S103, the processor 100 operates as the parameter generation unit 100C operable to generate, in accordance with the eye-point coordinates PV, the parameters PMT for generating, from the vehicle's exterior image $P_{40}$, the output images $PR_{IMG}$ and $PL_{IMG}$ to be displayed on the display devices $60_R$ and $60_L$.

Based on the parameter PMT generated in Step S103, the processor 100 generates the output images $PR_{IMG}$ and $PL_{IMG}$ from the vehicle's exterior image $P_{40}$ (Step S104). The above-described pixel interpolation processing is executed in Step S104, for example.

As described above, in Step S104, the processor 100 operates as the image generation unit 100D operable to generate the output images $PR_{IMG}$ and $PL_{IMG}$ from the vehicle's exterior image $P_{40}$ based on the parameter PMT generated by the parameter generation unit 100C.

The processor 100 outputs the output images $PR_{IMG}$ and $PL_{IMG}$ generated in Step S104 to the display devices 60$_R$ and 60$_L$ (Step S105).

Thus, in Step S105, the processor 100 operates as the image output unit 100E operable to output, to the display devices 60$_R$ and 60$_L$ the output images $PR_{IMG}$ and $PL_{IMG}$, respectively, generated by the image generating unit 100D.

During the execution of the image processing illustrated in FIG. 10, if the eye-point coordinate $P_V$ moves, for example, due to the occupant 2 moving his/her body, the scenes outside the vehicle displayed on the screen 60A$_R$ and 60A$_L$ (the output image $PR_{IMG}$ and the output image $PL_{IMG}$) change in real-time in accordance with the movement of the eye-point coordinates PV. Hence, the occupant 2 can experience a state where the occupant 2 visually recognizes the outside of the vehicle by viewing through the transparent front pillar portion.

In the image processing illustrating in FIG. 10, the parameter PMT is used to generate the output images $PR_{IMG}$ and $PL_{IMG}$. Thus, achieved is a reduced cost for the computation that is executed to perform highly accurate coordinate transformation between the coordinate systems and thus to display a natural vehicle's exterior image reproducing a real scene on a screen (non-planar surface) having a complicated shape such as the screen 60A$_R$. Hence, the processing load on the processor 100 is reduced greatly.

Figure 11:
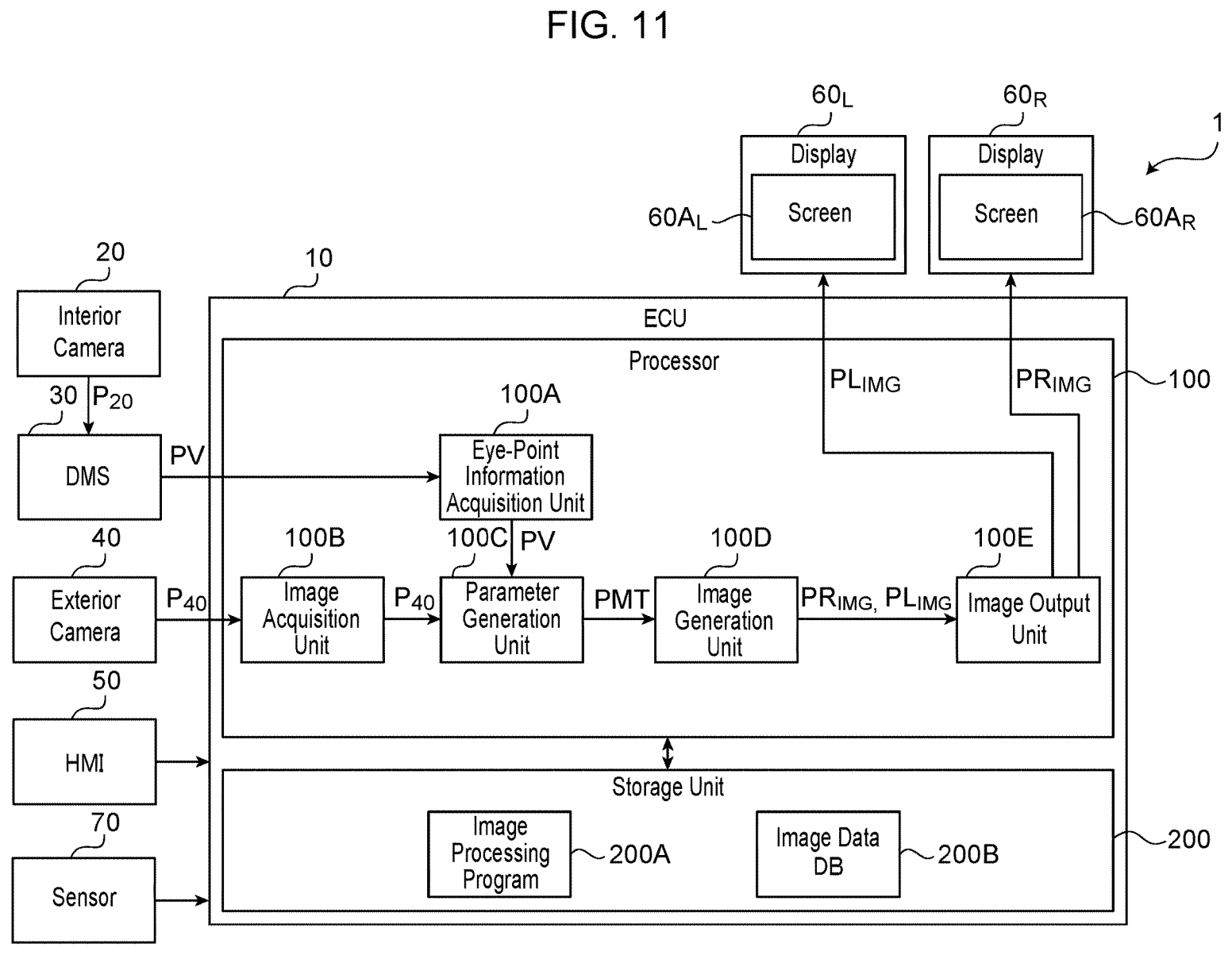

FIG. 11 is a block diagram illustrating a configuration of a display control system 1 according to Modified Example 1 of the present application. As illustrated in FIG. 11, the display control system 1 according to Modified Example 1 includes a sensor 70.

In Modified Example 1, the display devices 60$_R$ and 60$_L$ are movably installed in the vehicle cabin. For example, the display devices 60$_R$ and 60$_L$ are respectively installed on the right front pillar portion and the left front pillar portion via well-known mechanical mechanisms, thereby enabling the display devices 60R and 60L to perform tilting, panning, sliding, and the like motions.

For example, when the occupant 2 operates the HM150, the display devices 60$_R$ and 60$_L$ are driven to perform such motions as tilting, panning, sliding, and the like motions. The sensor 70 detects the motions of the display devices 60$_R$ and 60$_L$ relative to the right front pillar portion and the left front pillar portion, respectively. Motions of the display devices 60$_R$ and 60$_L$ in turn, change the positions of the screen 60A$_R$ and the screen 60A$_L$ to be arranged in the vehicle coordinate system.

Hence, the processor 100 updates the screen data D1 in accordance with the motions of the display devices 60$_R$ and 60$_L$ detected by the sensor 70. For example, the processor 100 updates the information on the positions of the display devices 60$_R$ and 60$_L$ included in the screen data D1. The update of the screen data D1, in turn, causes the update of the parameter PMT.

In this way, the parameter PMT is updated in accordance with the motions of the display devices 60$_R$ and 60$_L$. Hence, even with the motions of the screen 60A$_R$ and the screen 60A$_L$, it is possible to display a natural vehicle's exterior image that reproduces an actual scene while reducing the computation cost.

The description provided thus far is a description of exemplary embodiments of the present invention. The embodiments of the present invention are not limited to those described above, and various modifications are possible within the scope of the technical concept of the present invention. For example, appropriate combinations of embodiments and the like that are explicitly indicated by way of example in the specification or obvious embodiments and the like are also included in the embodiments of the present application.

Although a single ECU10 executes various processes in the above-described embodiment, the configuration of the present invention is not limited to this. In another embodiment, a plurality of ECUs may be configured to share and execute various processes. Execution of distributed processing by a plurality of ECUs improves, for example, the processing speed.

For example, the display control system 1 may be configured to include: a main ECU that executes various processes; and a sub ECU that holds the screen-data database and that mediates communications between the main ECU and the display devices 60$_R$ and 60$_L$.

One sub ECU as described above may be provided for each display device. In other words, the display control system 1 may be configured to include: a sub ECU that mediates communications between the main ECU and the display device 60$_R$ and a different sub ECU that mediates communications between the main ECU and the display device 60$_L$.

A single sub ECU may be provided for a plurality of display devices. In other words, the display control system 1 may be configured to include a sub ECU that mediates communications between the main ECU and each of the display devices 60$_R$ and 60$_L$.

The image processing according to the present embodiment can be applied not only to the display devices 60$_R$ and 60$_L$ but also to the display device 60$_C$ installed on the dashboard. Even when the display device 60$_C$ is, for example, a curved-screen display device, the load of the processing executed to display the output image $P_{IMG}$ can be reduced from the corresponding load in the conventional cases.

The vehicle's exterior image $P_{40}$ is not limited to a real-time captured image, but may be, for example, an image that was captured in the past.

The screen to display the output image $P_{IMG}$ thereon is not limited to the curved-screen display exemplified as the screen 60A, and may have a more complicated three dimensional shape. In addition, the screen to display the output image $P_{IMG}$ thereon may not be such a screen as an LCD screen or an organic EL display screen but may be a projection surface (for example, a surface of a structure including unevenness) that a projector can project images onto.

DESCRIPTION OF REFERENCE NUMERALS

1: Display control system
10: ECU
20: Interior camera
30: DMS
40: Exterior camera
50: HMI
60A$_R$, 60A$_L$: Screen
60$_R$, 60$_L$: Display device
100: Processor
100A: Eye-point information acquisition unit
100B: Image acquisition unit
100C: Parameter generation unit
100D: Image generation unit
100E: Image output unit
200: Storage device
200A: Image processing program
200B: Screen-data database

What is claimed is:

1. An image processing device disposed in a moving body and connected to a display device having a screen at least a part of which is non-planar, the image processing device comprising:

a controller; and an image capturing device configured to capture an outside-world image showing an outside world of the moving body;

wherein the controller is configured to:

receive information on an eye position of an occupant of the moving body;

generate a parameter for generating a display-target image to be displayed on the display device from the outside-world image in accordance with the information on the eye position;

generate the display-target image from the outside-world image based on the parameter; and output the display-target image to the display device;

wherein the parameter includes:

an element of a projective transformation matrix for transforming coordinates on a reference plane set in a real space from a first coordinate system corresponding to the real space to a second coordinate system that is a coordinate system of the outside-world image; and an element of a projective transformation matrix that transforms coordinates on the screen into coordinates on the reference plane corresponding to an area to be displayed on the screen, by specifying an intersection coordinate on the reference plane, where an extension line of the line segment connecting the eye position in the first coordinate system and the coordinate on the screen disposed in the first coordinate system based on screen data indicating a shape and a position of the screen intersecting with the reference plane set in the first coordinate system at the intersection coordinate on the reference plane.

2. The image processing device according to claim 1, wherein the parameter is used to: transform the coordinates of the outside-world image from those in the first coordinate system into those in the second coordinate system, and to transform the coordinates within the area into the coordinates of the screen, provided that a target of the transformations is some of the pixels of the screen; and the controller performs interpolation processing based on the information on some of the pixels included in the display-target image generated based on the parameter, thereby acquiring information on all pixels of the display-target image.

3. The image processing device according to claim 1, wherein, the screen is a substantially rectangular screen formed in a curved-surface shape that is curved in a first direction; and the screen data includes information on a curved-line shape in the first direction, a straight-line shape in a second direction perpendicular to the first direction, and an installation angle of the screen.

4. The image processing device according to claim 1, wherein the display device is installed in a pillar portion of the moving body.

5. The image processing device according to claim 1, wherein, the outside-world image is an image captured by the image capturing device including a wide-angle lens; and the parameter further includes an element for removing a barrel distortion of the outside-world image to transform the coordinates of the external image from those in the first coordinate system into those in the second coordinate system.

6. The image processing device according to claim 1, wherein the image processing device is connected to a plurality of display devices installed in the moving body;

the controller generates, in accordance with the information on the eye position, parameters corresponding respectively to the plurality of display devices; and the controller generates the display-target images corresponding respectively to the plurality of display devices based on the respective parameters generated by the controller.

7. An image processing device disposed in a moving body and connected to a display device having a screen at least a part of which is non-planar, the image processing device comprising:

an eye-point information acquisition unit configured to acquire information on an eye position of an occupant of the moving body;

an image acquisition unit configured to acquire an outside-world image showing an outside world of the moving body;

a parameter generation unit configured to generate a parameter for generating a display-target image to be displayed on the display device from the outside-world image in accordance with the information on the eye position;

an image generation unit configured to generate the display-target image from the outside-world image based on the parameter generated by the parameter generation unit; and an image output unit configured to output the display-target image generated by the image generation unit to the display device;

wherein the parameter includes:

an element of a projective transformation matrix for transforming coordinates on a reference plane set in a real space from a first coordinate system corresponding to the real space to a second coordinate system that is a coordinate system of the outside-world image; and an element of a projective transformation matrix that transforms coordinates of the screen into coordinates of the outside-world image within an area of the reference plane displayed on the screen, by specifying the coordinate on a reference plane, where the extension line of the line segment connecting the eye position in the first coordinate system and the coordinate on the screen disposed in the first coordinate system based on screen data indicating a shape and a position of the screen intersects with the reference plane set in the first coordinate system; and wherein the display device is movably installed in the moving body, and the parameter is updated in accordance with motions of the display device.

8. An image processing method executed by an image processing device disposed in a moving body and connected to a display device having a screen at least a part of which is non-planar, the method comprising the steps of:

acquiring information on an eye position of an occupant of the moving body;

acquiring an outside-world image showing an outside world of the moving body;

generating a parameter for generating a display-target image to be displayed on the display device from the outside-world image in accordance with the information on the eye position;

generating the display-target image from the outside-world image based on the generated parameter; and outputting the generated display-target image to the display device, wherein the parameter includes:

an element of a projective transformation matrix for transforming coordinates on a reference plane set in a real space from a first coordinate system corresponding to the real space to a second coordinate system that is a coordinate system of the outside-world image; and an element of a projective transformation matrix that transforms coordinates on the screen into coordinates on the reference plane corresponding to an area to be displayed on the screen, by specifying an intersection coordinate on the reference plane, where an extension line of the line segment connecting the eye position in the first coordinate system and the coordinate on the screen disposed in the first coordinate system based on screen data indicating a shape and a position of the screen intersecting with the reference plane set in the first coordinate system at the intersection coordinate on the reference plane.

9. The image processing method according to claim 8, wherein the parameter is used to: transform the coordinates of the outside-world image from those in the first coordinate system into those in the second coordinate system, and to transform the coordinates within the area into the coordinates of the screen, provided that a target of the transformations is some of the pixels of the screen; and in the step of generating the display-target image, performing interpolation processing based on the information on some of the pixels included in the display-target image generated based on the parameter, thereby acquiring information on all pixels of the display-target image.

10. The image processing method according to claim 8, wherein, the screen is a substantially rectangular screen formed in a curved-surface shape that is curved in a first direction; and the screen data includes information on a curved-line shape in the first direction, a straight-line shape in a second direction perpendicular to the first direction, and an installation angle of the screen.

11. The image processing method according to claim 8, wherein the display device is installed in a pillar portion of the moving body.

12. The image processing method according to claim 8, wherein the outside-world image is an image captured by an image capture device including a wide-angle lens; and the parameter further includes an element for removing a barrel distortion of the outside-world image to transform the coordinates of the external image from those in the first coordinate system into those in the second coordinate system.

13. The image processing method according to claim 8, wherein the image processing device is connected to a plurality of display devices installed in the moving body;

in the step of generating the parameter, parameters corresponding respectively to the plurality of display devices are generated in accordance with the information on the eye position; and in the step of generating the display-target image, the display-target images corresponding respectively to the plurality of display devices are generated based on the parameters generated in the step of generating the parameter.

14. The image processing method according to claim 8, wherein the display device is movably installed in the moving body; and the parameter is updated in accordance with motions of the display device.

* * * * *